(12) United States Patent
Maguin et al.

(10) Patent No.: US 10,443,462 B2
(45) Date of Patent: Oct. 15, 2019

(54) METHOD FOR EXTRACTING A LIQUID ADDITIVE FROM A TANK

(71) Applicant: CONTINENTAL AUTOMOTIVE GMBH, Hannover (DE)

(72) Inventors: Georges Maguin, Marly (FR); Sven Schepers, Troisdorf (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/773,235

(22) PCT Filed: Feb. 26, 2014

(86) PCT No.: PCT/EP2014/053703
§ 371 (c)(1),
(2) Date: Sep. 4, 2015

(87) PCT Pub. No.: WO2014/135411
PCT Pub. Date: Sep. 12, 2014

(65) Prior Publication Data
US 2016/0010526 A1   Jan. 14, 2016

(30) Foreign Application Priority Data

Mar. 6, 2013   (DE) .......... 10 2013 102 233

(51) Int. Cl.
*F01N 3/035*   (2006.01)
*F01N 3/20*   (2006.01)
(Continued)

(52) U.S. Cl.
CPC ......... *F01N 3/035* (2013.01); *B01D 29/0095* (2013.01); *B01D 29/56* (2013.01);
(Continued)

(58) Field of Classification Search
CPC .... F01N 3/035; F01N 3/2066; F01N 2610/02; F01N 2610/1406; F01N 2610/1426;
(Continued)

(56) References Cited

U.S. PATENT DOCUMENTS 4,192,746 A * 3/1980 Arvanitakis ........... B01D 21/00
210/193
4,789,474 A * 12/1988 Gaudfrin ................ B01D 29/39
210/333.01

(Continued)

FOREIGN PATENT DOCUMENTS

CN    102822467    12/2012
DE    102008001948    1/2009
(Continued)

OTHER PUBLICATIONS

Module 1: Overview of Nonwovens, ITT Delhi, NPTEL, Apr. 20, 2012 (Year: 2012).*

(Continued)

*Primary Examiner* — Audrey K Bradley
(74) *Attorney, Agent, or Firm* — Cozen O'Connor

(57) ABSTRACT

A method for extracting a liquid additive from an interior space of a tank at an extraction point includes: filtering the liquid additive by at least one filter that covers the extraction point and that is configured to separate the extraction point from the interior space of the tank and through which the liquid additive flows, wherein contaminants of the liquid additive are deposited on a surface of the filter, and extracting the liquid additive from the tank at the extraction point; forming at least one porous filter cake from contaminants of the liquid additive on the surface of the filter; and filtering the liquid additive by the at least one porous filter cake, (Continued)

wherein contaminants of the liquid additive are deposited in the filter cake, and extracting the liquid additive from the tank at the extraction point.

6 Claims, 2 Drawing Sheets

(51) Int. Cl.
| | | |
|---|---|---|
| B01D 29/00 | (2006.01) | |
| B01D 29/66 | (2006.01) | |
| B01D 29/56 | (2006.01) | |
| B01D 35/02 | (2006.01) | |
| B01D 53/94 | (2006.01) | |
| B60K 13/04 | (2006.01) | |

(52) U.S. Cl.
CPC .............. *B01D 29/66* (2013.01); *B01D 35/02* (2013.01); *B01D 53/9431* (2013.01); *B60K 13/04* (2013.01); *F01N 3/2066* (2013.01); *F01N 2610/02* (2013.01); *F01N 2610/1406* (2013.01); *F01N 2610/1426* (2013.01); *Y02A 50/2325* (2018.01); *Y02T 10/24* (2013.01)

(58) Field of Classification Search
CPC .... B01D 29/0095; B01D 29/56; B01D 29/66; B01D 35/02; B01D 53/9431; Y02T 10/24
See application file for complete search history.

(56) References Cited

U.S. PATENT DOCUMENTS

| | | | |
|---|---|---|---|
| 2003/0095894 A1 | 5/2003 | Umezawa et al. | |
| 2006/0266693 A1* | 11/2006 | Yoshida | B01D 29/56 210/335 |
| 2010/0276346 A1* | 11/2010 | Roesgen | B01D 27/06 210/90 |
| 2010/0323179 A1* | 12/2010 | Kim | D04H 1/4342 428/220 |
| 2013/0025269 A1 | 1/2013 | Hodgson et al. | |
| 2013/0168330 A1 | 7/2013 | Strasser et al. | |

FOREIGN PATENT DOCUMENTS

| | | |
|---|---|---|
| DE | 102009026764 A1 | 12/2010 |
| DE | 102010014314 A1 | 10/2011 |
| DE | 102010039056 | 2/2012 |
| EP | 1925354 | 5/2008 |
| EP | 2 166 208 | 3/2010 |
| JP | 2002-263407 | 9/2002 |
| JP | 2003-135914 | 5/2003 |
| JP | 2004-000991 | 8/2004 |
| JP | 2010-196522 | 9/2010 |
| KR | 20140068433 | 6/2014 |
| WO | WO 2011/109847 | 9/2011 |

OTHER PUBLICATIONS

Office Action dated Sep. 26, 2016 which issued in the corresponding Japanese Patent Application No. 2015-56016.
Office Action dated Jan. 19, 2017 which issued in the corresponding Russian Patent Application No. 2015142291/06(065340).
Bogdanov "Petroleum Products Dewaxing", State Publishing House, Moscow, 1961, 4 pages.
Office Action dated Sep. 26, 2016 which issued in the corresponding Japanese Patent Application No. 2015-560616.
Office Action dated Jan. 24, 2017 which issued in the corresponding Korean Patent Application No. 10-2015-7027572.
Office Action dated Apr. 26, 2017 which issued in the corresponding Chinese Patent Application No. 201480011002.9.
Office Action dated Mar. 14, 2018 which issued in the corresponding India Patent Application No. 2694/KOLNP/2015.

* cited by examiner

METHOD FOR EXTRACTING A LIQUID ADDITIVE FROM A TANK

CROSS-REFERENCE TO RELATED APPLICATIONS

This is a U.S. national stage of application No. PCT/EP2014/053703, filed on 26 Feb. 2014, which claims priority to the German Application No. DE 10 2013 102 233.2 filed 6 Mar. 2013, the content of both incorporated herein by reference.

BACKGROUND OF THE INVENTION

1. Field of the Invention

The invention relates to a method for extracting a liquid additive from a tank.

2. Related Art

In the automotive field, widespread use is made of exhaust-gas treatment devices in which a liquid additive is used for the purification of the exhaust gases of an internal combustion engine.

An exhaust-gas purification method particularly commonly carried out in such exhaust-gas treatment devices is the method of selective catalytic reduction (SCR method). In this method, nitrogen oxide compounds in the exhaust gas react with the aid of a reducing agent to form non-hazardous substances. Ammonia in particular is used as reducing agent for this purpose. Ammonia is normally stored in motor vehicles not directly but rather in the form of a reducing agent precursor solution, which can be stored and provided as liquid additive. The liquid additive is supplied to the exhaust gas. It can be converted in the exhaust gas, by the action of the heat of the exhaust gas, to form ammonia. The conversion may also be assisted (if appropriate outside the exhaust gas) by a hydrolysis catalytic converter. A liquid additive particularly commonly used as a reducing agent precursor solution for exhaust-gas purification is urea-water solution. A 32.5% urea-water solution is available under the trade name AdBlue®.

For the provision of liquid additive in a motor vehicle, a tank is normally required, in which the liquid additive is stored. Furthermore, a device is required by which the liquid additive can be extracted from the tank and supplied in a dosed manner to the exhaust-gas treatment device.

The liquid additive in a tank in a motor vehicle may contain contaminants. Such contaminants may, on the one hand, pass into the tank during the tank filling process. It is also possible for the liquid additive to form crystalline deposits that are present as contaminants in the tank. The described contaminants can cause damage to a device for delivering and dosing the liquid additive. For example, injectors or nozzles which serve for the metering of the liquid additive into the exhaust-gas treatment devices can be blocked by the contaminants. It may also be the case that the contaminants act as abrasive particles in a delivery and dosing device, and thus lead to increased wear. The contaminants can even cause damage in the exhaust-gas treatment device itself.

For the purification of the liquid additive, filter devices have proven to be expedient. A problem of filter devices is, however, that the action thereof is impaired by the contaminants. For example, filter devices become contaminated and/or blocked by the contaminants. Regular maintenance and/or cleaning of known filter devices for liquid additives is therefore necessary.

SUMMARY OF THE INVENTION

Taking the prior art as a starting point, it is an object of the present invention to solve, or at least lessen, the problems highlighted in conjunction with the prior art. It is sought in particular to disclose a particularly advantageous method for extracting a liquid additive from the interior space of a tank. The method should firstly purify, and remove contaminants from, the liquid additive to a sufficient extent. Furthermore, no maintenance, or minimal maintenance, of the delivery and dosing device should be required.

Accordingly, a method is proposed for extracting a liquid additive from an interior space of a tank at an extraction point, having at least the following steps:

a) filtration of the liquid additive by a filter which covers the extraction point and which separates the latter from the interior space of the tank and through which the liquid additive flows, wherein contaminants of the liquid additive are deposited on a surface of the filter, and extraction of the liquid additive from the tank at the extraction point;

b) formation of at least one porous filter cake from contaminants of the liquid additive on the surface of the filter; and c) filtration of the liquid additive by the at least one porous filter cake, wherein contaminants of the liquid additive are deposited in the filter cake, and extraction of the liquid additive from the tank at the extraction point.

The extraction point is preferably a suction point at which the liquid additive can be sucked out of the tank by means of a pump. The extraction point is preferably arranged on a device for providing the liquid additive. The device preferably has a housing, which is inserted into an opening in a tank base of the tank and closes off the opening in a fluid-tight manner. The device preferably also has a line connector on the housing. The liquid additive that is extracted from the tank is provided at the line connector. A supply line may be connected to the line connector. Such a supply line may for example lead to a feed device for the metering of the liquid additive into an exhaust-gas treatment device. A delivery duct runs through the housing of the device from the extraction point to the line connector. On the delivery duct there is preferably also situated a pump, which effects the delivery of the liquid additive.

The filter is preferably arranged around the outside of a housing of the device. The housing is preferably cylindrical. The filter is accordingly preferably arranged annularly around the cylindrical housing.

An intermediate space preferably exists between the filter and the housing. This intermediate space is separated from the interior space of the tank by the filter. Liquid additive that passes from the interior space into the intermediate space must pass through the filter. It can thus be ensured that contaminants in the liquid additive can be retained by the filter and cannot pass into the intermediate space. Accordingly, only filtered additive, or additive substantially free from undesired contaminants, is situated in the interior space. The filter has a filter surface area (facing the interior space of the tank and facing the intermediate space respectively). The filter surface area describes the areal extent of the filter. The filter surface area is preferably between 90 cm$^2$ and 600 cm$^2$ square centimeters] in size. The filter also has a filter depth. The filter depth is defined by the distance between a surface of the filter facing towards the tank interior space and a surface of the filter facing towards the intermediate space. The filter depth is preferably between 0.2 mm [millimeters] and 10 mm.

The filter is preferably formed from a porous material. The material may for example be a fibrous nonwoven (in particular in the form of a tangled and/or unordered arrangement) or an open-pored foam. The filter may be described by a duct system that extends between the surface facing towards the interior space and the surface facing towards the intermediate space. The duct system is connected to openings on the two surfaces. There is firstly a multiplicity of filter ducts which connect openings on the surface at the interior space to openings on the surface at the intermediate space. Furthermore, there are secondly connecting ducts which connect the ducts to one another and thus form bypasses through which the liquid additive can flow if a filter duct from the interior space to the intermediate space is at least partially blocked. The porous material is characterized in particular in that it does not comprise a regular duct system with constantly repeating duct forms, but that it rather comprises a type of open, (interconnected), chaotic pore system.

During the filtering of the liquid additive in step a), contaminants of the liquid additive are deposited not in the intermediate space downstream of the surface of the filter but rather directly on the (outer and/or inner) surface of the filter. The contaminants thus do not pass through the filter. In particular, the contaminants remain in the interior space of the tank. The filtering process takes place in particular at the same time as the extraction of additive, that is to say when a flow of the additive is effected through the filter.

In step b), a filter cake is formed from contaminants on the surface of the filter. This occurs by virtue of more and more contaminants being deposited on the surface of the filter. Here, the contaminants initially adhere to the surface of the filter. When the surface of the filter is covered with contaminants, the contaminants also begin to adhere to one another. The filter cake thus begins to become thicker. This thickness is referred to as the filter cake thickness. The filter cake formed in step b) may grow up to a filter cake thickness of up to 5 mm [millimeters]. For this purpose, a large amount of contaminants must be deposited on the surface of the filter.

The filter cake itself is porous or has a porosity. This means that the filter cake is permeable to liquid additive. Liquid additive can pass through the filter cake from the interior space to the surface of the filter, and can flow onward from there through the filter into the intermediate space and to the extraction point. The porosity of the filter cake preferably differs (significantly) from the permeability of the material of the filter itself.

In step c), further contaminants of the liquid additive are deposited. During step c), however, the deposition takes place not (only) on the surface of the filter cake but rather (in particular or predominantly) within the filter cake. During step b), deposits are preferably still deposited on the surface of the filter cake, causing the filter cake to become thicker. As a result of the deposition within the filter cake, the porosity of the filter cake decreases. The permeability of the filter cake for liquid additive thus simultaneously also decreases. In step c), simultaneously with the deposition of contaminants in the filter cake, liquid additive continues to be extracted from the tank at the extraction point. Method steps b) and c) preferably also take place partially in parallel in terms of time. In particular, there is a phase in which the filter cake thickness continues to grow further (step b)) and at the same time a (partial) deposition of liquid additive in the filter cake occurs (step c)). The extraction of the liquid additive from the tank preferably takes place without interruption and/or continuously during method steps a) to c).

By the described method, it is possible for contaminants of the liquid additive to be retained by a filter without the contaminants penetrating into the filter. The filter thus cannot become blocked. The maintenance of a device for the extraction of liquid additive from a tank can thus be simplified. In particular, no regular cleaning process is required for the cleaning of a filter.

The method is particularly advantageous if the filter cake formed in step b) has a multiplicity of ducts which extend from the surface of the filter to the interior space of the tank and which form a porosity.

Contaminants of the liquid additive are deposited on the surface of the filter at the edge of the openings, while the liquid additive flow into the openings. Ducts in the filter cake (filter cake ducts) thus extend from the openings of the filter towards the interior space of the tank. The ducts in the filter cake preferably form continuations of the filter ducts, described further above, in the filter. It is preferable for the ducts in the filter cake to be kept open for as long as possible, and to not become blocked, in step b) and in step c). This is ensured in that the deposition of contaminants takes place for as long as possible and predominantly on the (outer) surface of the filter cake (step b)) and not yet in the filter cake (step c)). A porosity of the filter cake is thus formed.

The method is furthermore advantageous if the filter cake is repeatedly at least partially removed.

The removal of the filter cake may be referred to as step d), which is performed subsequently to step c). Method steps a) to c) or a) to d) are preferably repeated at regular intervals in the manner of a loop and/or take place at least partially simultaneously.

In particular during the deposition of contaminants in the filter cake in step c), the porosity of the filter cake decreases, and thus the permeability of the filter cake for the liquid additive also decreases. A flow resistance of the filter cake thereby increases. For this reason, it is advantageous if the filter cake is repeatedly at least partially removed at regular intervals. The flow resistance of the filter cake then decreases.

The removal of the filter cake may be repeated at regular time intervals. A possible repetition interval for this purpose is, for example, between 10 operating hours and 400 operating hours of the device for extracting liquid additive from the tank. The repetition interval is preferably defined as a function of the rate of contamination of the filter. The rate of contamination is dependent on the amount of contaminants in the liquid additive. It is also possible for the removal of the filter cake to take place in each case when the filter cake reaches a certain thickness. For example, the removal of the filter cake may take place whenever the filter cake reaches a filter cake thickness of more than 1 mm [millimeters], preferably more than 2 mm. The removal of the filter cake preferably takes purely by mechanical action. It must furthermore be clarified that the filter remains in the tank during step d), that is to say the step should be considered not to involve any separate cleaning of the filter outside the tank and/or with the tank empty.

The method is furthermore advantageous if the surface of the filter is at least partially oriented such that the filter cake is at least partially removed by a gravitational force when the weight of the filter cake per square centimeter of a filter surface area of the filter is greater than a threshold value. Below the filter, there may be provided on the device and/or on the tank a so-called sump in which particles that have detached from the filter cake collect.

The contaminants of the liquid additive are usually heavier than the liquid additive. The contaminants of the liquid additive are thus pulled downwards by the force of gravity. The thicker the filter cake composed of the contaminants is, the greater the weight of the filter cake per square centimeter of filter surface area is. By a suitable orientation of the filter or of the surface of the filter, it can be achieved that the gravitational force acting on the filter cake removes the contaminants when the weight of the filter cake per square centimeter of a filter surface area exceeds a threshold value. The threshold value may for example be more than 100 $mg/cm^2$ [milligrams per square centimeter], preferably more than 200 $mg/cm^2$. Where reference is made below to the surface of the filter, this means that surface of the filter that faces towards the interior space of the tank.

The orientation is preferably selected such that the gravitational force exerts a significant force component away from the surface of the filter. The surface of the filter may for example be oriented vertically. The filter cake is then pulled away from the filter parallel to the surface of the filter by the gravitational force. It is also possible for that surface of the filter that faces toward the interior space of the tank to be oriented at least partially downward. The gravitational force then acts directly away from the surface of the filter. This permits a particularly effective removal of the filter cake.

The method is furthermore advantageous if, at the surface of the filter, a flow of the liquid additive is generated that causes the filter cake to be at least partially detached from the surface.

A flow of the liquid additive for detaching the filter cake may be initiated for example by sloshing movements of the liquid additive in the tank.

The method is also advantageous if the flow of the liquid additive for detaching the filter cake runs from the extraction point to the interior space of the tank.

The method is furthermore advantageous if the flow is generated by backward delivery by a pump for delivering the liquid additive. For example, the delivery direction of a pump may be reversed, such that the liquid additive is forced from the extraction point back into the tank through the filter. The liquid additive then pushes the filter cake away from the filter. Such operation of the pump may take place in a targeted manner at defined times. This permits a particularly effective removal of the filter cake. Backward delivery may for example be performed when the operation of a device for providing liquid additive is ended. The device can simultaneously be emptied by the backward delivery. That is to say liquid additive is removed from the device.

The method is furthermore advantageous if, during the extraction of the liquid additive from the interior space of the tank in method steps a) and c), a pressure gradient is generated across the filter between the interior space and the extraction point, wherein the filter cake is removed if the pressure gradient exceeds a predefined threshold value.

A pressure gradient across the filter is in particular a pressure gradient between the interior space of the tank and the intermediate space between the filter and the extraction point. This pressure gradient may, for example, be monitored by pressure sensors at the interior space and at the intermediate space. The monitoring may also be performed by a differential pressure sensor that directly measures a pressure difference between the interior space and the intermediate space.

The method is particularly advantageous if the pressure gradient is determined on the basis of a power consumption of a pump for delivering the liquid additive and on the basis of a pressure generated by the pump.

The power consumption of the pump and the pressure generated by the pump are dependent on a (flow) resistance against which the pump operates in order to deliver the liquid additive during the extraction of the liquid additive from the tank. If the power expended during the build-up of pressure is subtracted from the power consumption, this yields a measure of the resistance and thus of the pressure gradient. The power consumption of the pump may be determined electronically by a controller of the drive of the pump. The pressure generated by the pump may be monitored by a pressure sensor arranged on the delivery duct downstream of the pump as viewed in the flow direction of the liquid additive.

If the pressure gradient exceeds a threshold value, a flow for detaching the filter cake from the filter may for example be generated. This may for example be realized by a reversal of the delivery direction of the pump.

Also proposed here is a device for providing liquid additive, having a tank with an interior space in which the liquid additive is stored and with an extraction point at which the liquid additive can be extracted from the tank, and having a filter which covers the extraction point and which separates the latter from the interior space of the tank, wherein the surface of the filter is configured such that contaminants of the liquid additive are deposited on the surface of the filter when the liquid additive flows through the filter, and the contaminants form a porous filter cake on the surface.

Such a device is in particular suitable and set up for carrying out the method, particularly advantageously proposed here, for extracting liquid additive from a tank. The special design features of a device of this type as already described further above may be implemented in order to improve the device. The special advantages specified for the described method can be applied and transferred analogously to the device.

The surface of the filter preferably promotes the adhesion of contaminants of the liquid additive. This may, for example, be ensured by a specific surface tension of the surface of the filter. The surface of the filter may, for example, be hydrophobic or hydrophilic in order improve the adhesion of contaminants. It is also possible for the surface of the filter to have chemical properties that promote the deposition of contaminants. The surface of the filter may, for example, be configured so as to chemically correspond to the contaminants. If the contaminants are composed predominantly of crystalline urea particles, the surface may, for example, be configured such that chemical bonds form between the surface and the crystalline urea particles.

Also specified is a motor vehicle having an internal combustion engine and having an exhaust-gas treatment device for purifying the exhaust gases of the internal combustion engine and also having a corresponding device for providing a liquid additive for the exhaust-gas treatment device, the device being configured to carry out the described method.

An SCR catalytic converter is preferably provided in the exhaust-gas treatment device. The exhaust-gas treatment device preferably also has a feed device by which a liquid additive can be supplied to the exhaust-gas treatment device. The feed device is supplied with liquid additive by the described device and/or is even a constituent part of the described device. The feed device may, for example, have an injector and/or a nozzle, wherein an injector performs the dosing of the liquid additive, and the nozzle ensures a fine atomization of the liquid additive in the exhaust-gas treatment device. For the connection of the feed device to the tank, a line is connected to a line connector of the device, which line leads to the feed device.

BRIEF DESCRIPTION OF THE DRAWINGS

The invention and the technical field will be explained in more detail below on the basis of the figures. The figures show particularly preferred embodiments, to which the invention is however not restricted. It is pointed out in particular that the figures, and in particular the illustrated dimensional relationships, are merely schematic. In the figures.

DETAILED DESCRIPTION OF THE PRESENTLY PREFERRED EMBODIMENTS

Figure 1:
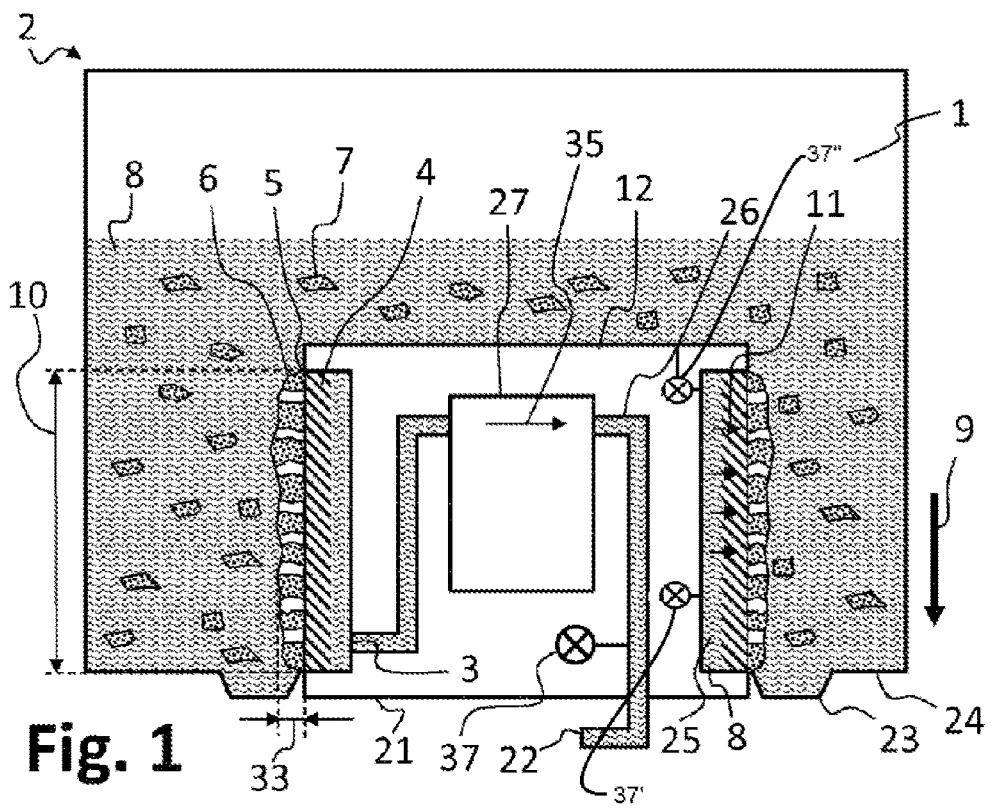
FIG. 1: shows a tank having an advantageous device according to the present invention.

FIG. 1 shows a tank 2 having an interior space 1 in which liquid additive 8 is stored and which has a tank base 24. A device 12 is inserted into the tank base 24. The device 12 has a housing 21 that closes off an opening in the tank base 24 in a fluid-tight manner. On the housing 21 there is situated an extraction point 3 at which liquid additive 8 can be extracted from the tank 2. A delivery duct 26 runs through the housing 21 from the extraction point 3 to a line connector 22. On the delivery duct 26 there is also situated a pump 27 by which the liquid additive can be delivered. Downstream of the pump 27 as viewed in a delivery direction 35 of the liquid additive 8, there is arranged on the delivery duct 26 a pressure sensor 37 by which the pressure built up in the delivery duct 26 by the pump 27 can be monitored. A pressure gradient across the filter is in particular a pressure gradient between the interior space 1 of the tank and the intermediate space 25 between the filter and the extraction point. This pressure gradient may be monitored by a pressure sensor 37' at the intermediate space 25. The monitoring may also be performed by a differential pressure sensor 37" that directly measures a pressure difference between the interior space 1 and the intermediate space 25 or the pressures at the interior space 1 and the intermediate space 25.

The extraction point 3 is covered with respect to the interior space 1 of the tank 2 by a filter 4. The filter 4 has a filter surface area 10 and a filter depth 32 (seen in FIG. 2). Between the filter 4 and the extraction point 3 there is situated an intermediate space 25 (that is partially freely encircling in sections) that ensures that the liquid additive 8 can pass to the extraction point 3 from any point of the filter 4. Contaminants 7 are situated in the liquid additive 8. The contaminants 7 are deposited as a filter cake 6 on that surface 5 of the filter 4 that faces towards the interior space 1. The filter cake 6 has a filter cake thickness 33.

Also illustrated in FIG. 1 is the gravitational force 9 that removes the filter cake 6 when the weight of the filter cake 6 per unit of filter surface area 10 becomes greater than a threshold value. Likewise schematically illustrated in FIG. 1 is a flow 11 that removes the filter cake 6 from the filter 4.

The tank 2 illustrated in FIG. 1 has a sump 23 in which particles that have become detached from the filter cake can collect.

Figure 2:
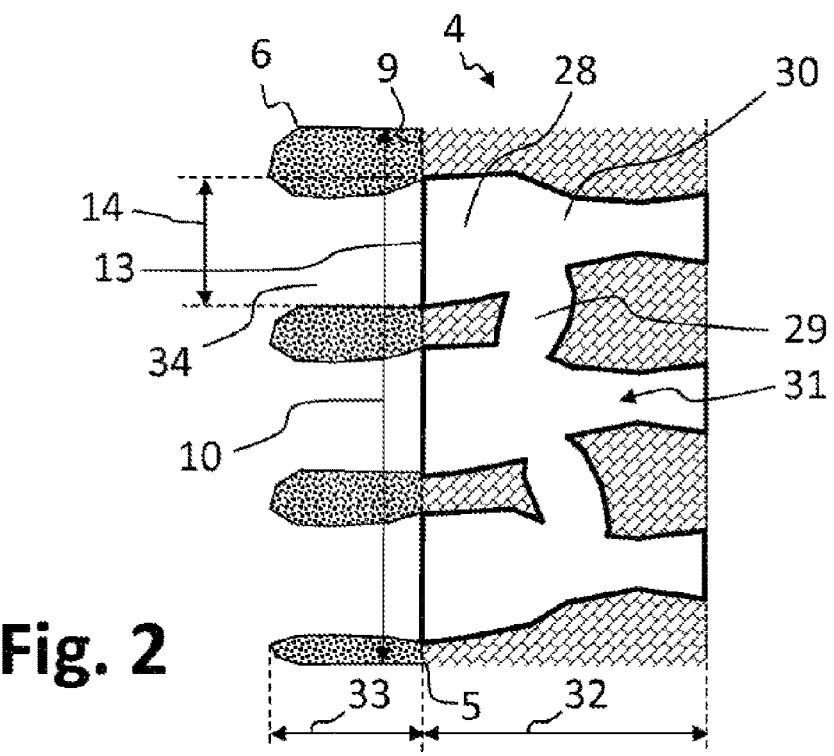
FIG. 2: shows a detail of a filter for a device of the type shown in FIG. 1.

FIG. 2 shows a section of the filter 4 on which a filter cake 6 has formed. The filter 4 has a surface 5 with openings 13, which have a cross-sectional area 14. Filter ducts 28 extend through the filter 4 from the openings 13. The filter ducts 28 are partially also connecting ducts 29, which connect the filter ducts 28 and thus form a duct system 30 of a porosity 31. The filter ducts 28 continue in the filter cake 6. In the filter cake 6 there are formed filter cake ducts 34 which adjoin the openings 13 in the surface 5 of the filter.

Figure 3:
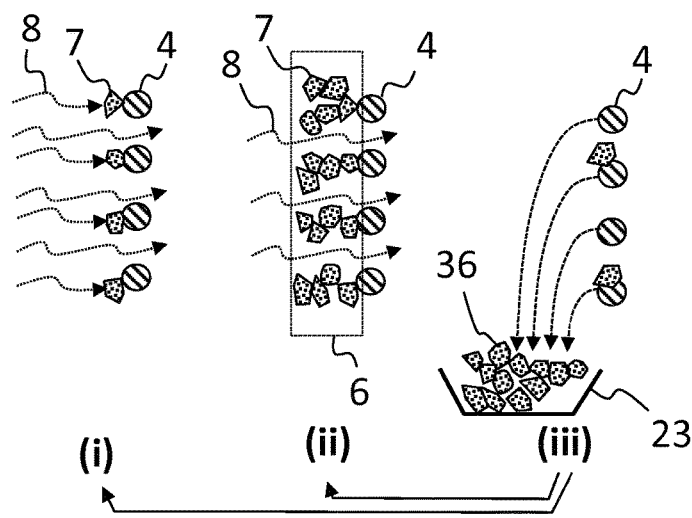
FIG. 3: shows a flow diagram of a method according to the present invention.

FIG. 3 shows a simplified and purely illustrative diagram of the method. The filter 4 is shown. In step i), first contaminants 7 collect on the filter 4. At the same time, liquid additive 8 flows through the filter 4. In step ii), a filter cake 6 has formed from the contaminants 7 on the filter 4. Liquid additive 8 flows onward through the filter 4 and the filter cake 6. In step iii), the filter cake 6 has been detached from the filter 4. The filter cake 6 may for example have been detached from the filter 4 by a flow or by a gravitational force. Here, particles 36 that have detached from the filter cake 6 collect in a sump 23. Arrows indicate that the illustrated method steps are repeated iteratively in the manner of a loop. It is possible for the filter cake 6 to be completely removed and for all of method steps i) to iii) to be repeated at regular intervals. It is also possible for the filter cake to always be only partially detached, and for only method steps iii) and ii) to be repeated at regular intervals. A residual amount of filter cake 6 or of contaminants 7 then always remains on the filter 4. Method steps i) and ii) correspond to method steps a), b) and c) of the method specified further above. Method step iii) corresponds to the additionally previously specified step d) for the removal of the filter cake 6.

Figure 4:
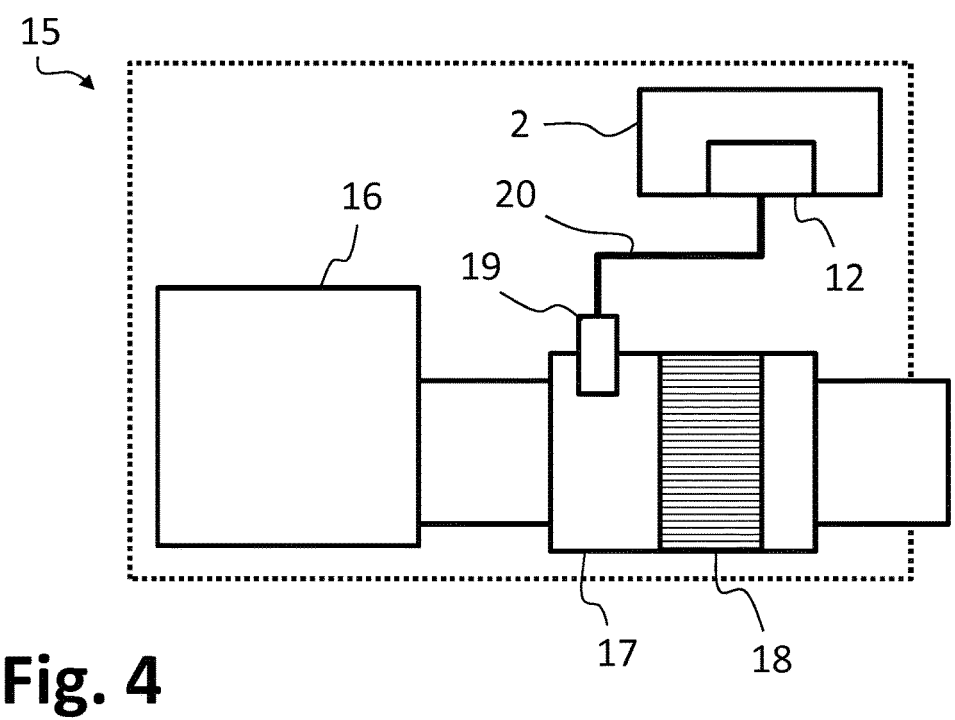
FIG. 4: shows a motor vehicle having an advantageous device according to the present invention.

FIG. 4 shows a motor vehicle 15 having an internal combustion engine 16 and having an exhaust-gas treatment device 17 for the purification of the exhaust gases of the internal combustion engine 16. The exhaust-gas treatment device 17 has an SCR catalytic converter 18 by which the method of selective catalytic reduction can be carried out for the purification of the exhaust gases. For this purpose, a liquid additive may be supplied to the exhaust-gas treatment device 17 by a feed device 19. Liquid additive is supplied from a tank 2 to the feed device 19 by a device 12. For this purpose, the device 12 is connected to the feed device 19 via a line 20.

Individual details or processes of the situations illustrated in the figures need not imperatively be combined with other details or processes in the same figure. It should therefore generally apply that a combination of the individual features of the subjects of the figures need only imperatively be combined if this is explicitly specified in the description or if it is obvious that the desired technical function is otherwise no longer provided.

The invention relates to a particularly effective method for the extraction of liquid additive from a tank, in which method the liquid additive is purified of contaminants. At the same time, no maintenance of the device is necessary. In particular, regular cleaning of a filter need not be performed.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for extracting a liquid additive (8) from an interior space (1) of a tank (2) at an extraction point (3), the method comprising:
   a) filtering the liquid additive (8) by at least one filter (4) that covers the extraction point (3) and that is configured to separate the extraction point (3) from the interior space (1) of the tank (2) and through which the liquid additive (8) flows, wherein contaminants of the liquid additive (8) are deposited on a surface (5) of the filter (4), and extracting the liquid additive (8) from the tank (2) at the extraction point (3);
   b) forming at least one porous filter cake (6) from contaminants (7) of the liquid additive (8) on the surface (5) of the filter;
   c) filtering the liquid additive (8) by the at least one porous filter cake (6), wherein contaminants (7) of the liquid additive (8) are deposited in the filter cake (6), and extracting the liquid additive (8) from the tank (2) at the extraction point (3); and
   (d) repeatedly at least partially removing the filter cake (6);
   wherein during the extraction of the liquid additive (8) from the interior space (1) of the tank (2) in method steps a) and c), generating a pressure gradient across the filter (4) between the interior space (1) and the extraction point (3), and removing the filter cake (6) if the pressure gradient exceeds a predefined threshold value,
   wherein the pressure gradient is determined on the basis of a power consumption of a pump (27) for delivering the liquid additive (8) and on the basis of a pressure generated by the pump (27).

2. The method according to claim 1, wherein the filter cake (6) formed in step b) has a multiplicity of ducts extending from the surface (5) of the filter to the interior space (1) of the tank, which multiplicity of ducts form a porosity (31).

3. The method according to claim 1, wherein the surface (5) of the filter (4) is at least partially oriented such that the filter cake (6) is at least partially removed by a gravitational force (9) when the weight of the filter cake (6) per square centimeter of a filter surface area (10) of the filter (4) is greater than a threshold value.

4. The method according to claim 1, wherein, at the surface (5) of the filter (4), a flow (11) of the liquid additive (8) is generated that causes the filter cake (6) to be at least partially detached from the surface (5).

5. The method according to claim 4, wherein the flow (11) of the liquid additive (8) for detaching the filter cake (6) runs from the extraction point (3) to the interior space (1) of the tank (2).

6. The method according to claim 5, further comprising generating flow (11) for delivering the liquid additive (8) by backward delivery by a pump (27).

* * * * *